United States Patent [19]

Barbic et al.

[11] Patent Number: 4,775,248
[45] Date of Patent: Oct. 4, 1988

[54] MULTIPLE FEED OIL SUPPLY SYSTEM FOR FLUID DAMPER

[75] Inventors: Jack R. Barbic, Tequesta, Fla.; Kurt L. Nichol, Estill Springs, Tenn.

[73] Assignee: United Technologies Corporation, Hartford, Conn.

[21] Appl. No.: 133,962

[22] Filed: Dec. 16, 1987

[51] Int. Cl.⁴ ............................................. F16C 19/06
[52] U.S. Cl. ..................................................... 384/99
[58] Field of Search ................. 384/99, 101, 102, 535, 384/581, 624

[56] References Cited

U.S. PATENT DOCUMENTS 4,213,661 7/1980 Marmol .
4,337,983 7/1982 Hibner ................................. 384/99
4,404,724 12/1983 Christ et al. ..................... 29/116 AD
4,440,456 4/1984 Klusman .............................. 384/99
4,669,893 6/1987 Chalaire et al. ...................... 384/99

Primary Examiner—Lenard A. Footland
Attorney, Agent, or Firm—Norman Friedland

[57] ABSTRACT

Structure for preventing cavitation and/or starvation in an oil film squeeze annular damper for dampening the high energy vibrations occasioned by a rotating shaft by including a plurality of judiciously located inlets to the annular damper so as to place in continuous communication the low pressure portion of the annulus with the supply source. Three inlet ports equally spaced about the circumference of the annulus disclose an exemplary supply system wherein each inlet includes a check valve for preventing backflow from the annulus.

3 Claims, 3 Drawing Sheets

MULTIPLE FEED OIL SUPPLY SYSTEM FOR FLUID DAMPER

This invention was made under a Government contract and the Government has rights herein.

DESCRIPTION

1. Technical Field

This invention relates to fluid dampers for damping cyclical, transverse orbital movement of a nonrotating cylindrical body occasioned by the rotating shaft carrying the compressors and turbines of a gas turbine engine and particularly to means for preventing cavitation.

2. Background Art

This invention constitutes an improvement over the fluid damping systems disclosed and claimed in U.S. Pat. No. 4,669,893 entitled "Annular Oil Damper Arrangement" granted on June 2, 1987 to Donald Chalaire, Halfen L. Hoyt and James Hurchalla, and U.S. Pat. No. 4,213,661 entitled "Bearing Support Structure Combining Fluid Damping and Spring Damping Apparatus" granted on July 22, 1980 to R. A. Marmol, both patents being assigned to United Technologies Corporation, the assignee of this patent application, the details of which are incorporated herein by reference and reference should be made thereto.

As is disclosed in U.S. Pat. No. 4,669,893, the fluid damper for the bearings supporting the compressor/turbine shaft of a gas turbine engine serves to control the transverse orbital movement of a nonrotating cylinder induced by the vibratory energy created by unbalance in the rotating shaft. The amplitudes of these vibrations are particularly high whenever a loss of blade occurs. It is therefore most important that the oil film retains its stiffness during the entire operation of the engine.

One of the problems encountered, which is addressed by the present invention, is that cavitation and/or starvation can occur during the sudtion cycle of the orbital movement of the nonrotating cylinder. This, of course, allows aeration of the oil film with a consequential reduction of film stiffness.

DISCLOSURE OF THE INVENTION

We have found that we can obviate or significantly reduce cavitation/starvation by incorporating a multiple oil feed system for delivering oil to the fluid damper. The oil feeds are judiciously located about the circumference of the damper so that at least one of the plurality of oil feed inlets will be in communication with the low pressure (suction) portion of the fluid damper annulus. Each of the oil feeds will have a check valve to assure that the fluid in the damper will not backflow out of the supply line.

An object of this invention is to provide an improved fluid damper for a bearing supporting the compressor/turbine shaft of a gas turbine engine.

A still further object is to provide an improved fluid damper that mitigates or eliminates cavitation and/or starvation by incorporating judiciously spaced inlet feeds for supplying oil to the damper.

The foregoing and other features and advantages of the present invention will become more apparent from the following description and accompanying drawings.

BEST MODE FOR CARRYING OUT THE INVENTION

Figure 1:
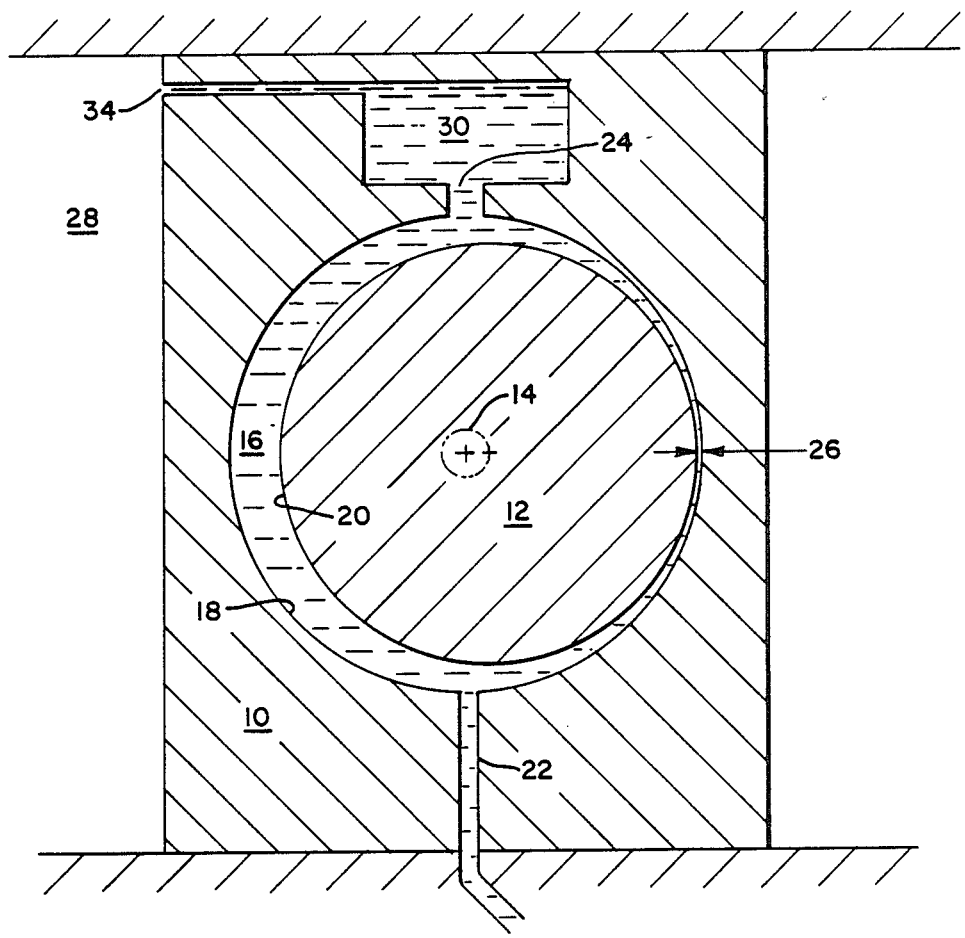
FIG. 1 shows a cross sectional view normal to the axis of rotation of a prior art annular damper.

Reference is made to the prior art dampers disclosed in FIG. 1 which shows a portion of a typical fluid damper comprising support housing 10 disposed about a cylindrical internal member 12 which is subject to attempted cyclical orbital motion 14. Cylindrical member 12 is the nonrotating bearing sleeve, hereinafter referred to as the sleeve 12. A flow of damping fluid is introduced into the annular volume 16 formed between the inner surface 18 of the support member 10 and the outer surface 20 of the sleeve 12 via supply conduit 22.

The fluid fills the annular volume 16, eventually exiting through a vent opening 24 also disposed in the support 10. During operation, the damper thus described absorbs the momentum of the sleeve 12 through viscous and hydrodynamically created forces resulting from the presence of the damping fluid in the annulus 16.

Figure 3:
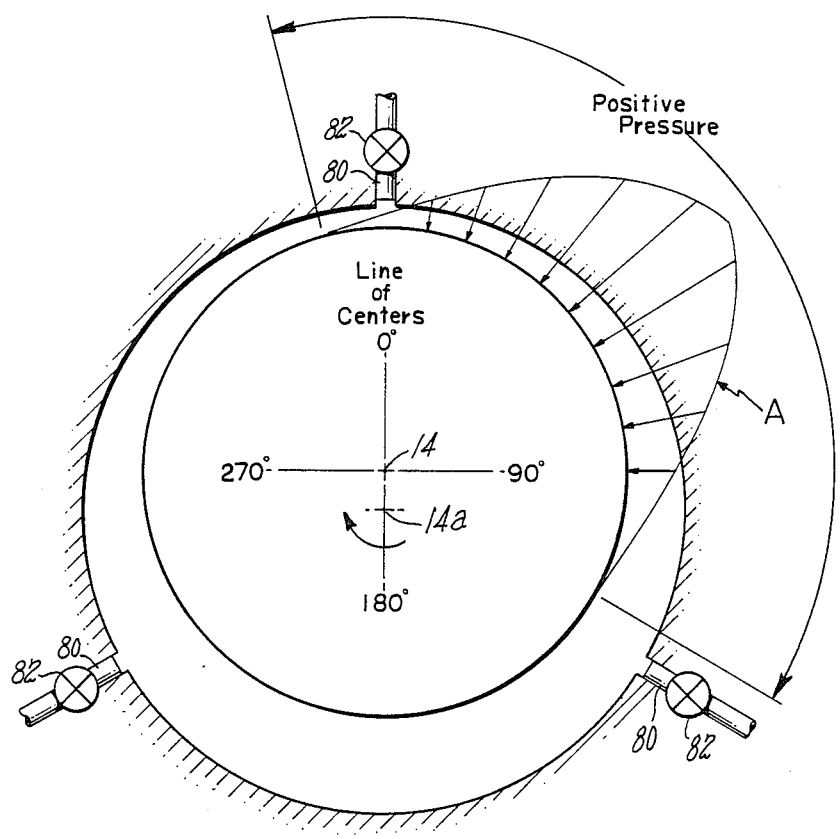
FIG. 3 is the improved damper schematically illustrated showing the inlet supply lines.

As is well known, the orbital motion 14 of the sleeve 12 causes a circumferential pressure wave to be propagated around the support member surface 18 in advance of the orbiting line of closest approach 26 between the sleeve 12 and the support 10. The local fluid pressure reaches a maximum within the circumferential pressure wave (FIG. 3, Area A) which when resolved into component forces produces a spring force which acts in parallel, and adds to the centering spring 48 force, thereby exerting a substantial radial opposing force on the sleeve 12 and preventing undesirable contact between the sleeve 12 and support surfaces 20, 18 and a damping force which opposes the orbiting motion. local region of relatively low pressure also trails the sleeve 12. This is identified as the cavitation region ir FIG. 3. The continuous supply of the fluid within the annulus 16 from supply conduit 22 is essential to the continued operation of such dampers.

The vent 24 opens into a low pressure scavenge area or the like wherein the vented damping fluid is collected for subsequent cooling, other usage, or recycle. Such low pressure venting, which is extremely simple to implement, reduces the local fluid pressure within the annulus 16 as the rotating pressure zone passes adjacent to the vent opening 24.

As we described in U.S. Pat. No. 4,669,893 supra, fluid pressure is maintained within the annulus 16 and the reservoir 30 by providing a sized orifice 34 in the reservoir 30 for restricting the flow of hydraulic fluid therefrom. Orifice 34 is sized not only to regulate the volume flow of damping fluid through the damper, but also to maintain the fluid pressure within the reservoir volume 30 and annulus 16 as high as practicable to prevent separation of dissolved air in the moving low pressure zone. For typical aircraft gas turbine ergines having a lubricating oil supply average pressure of 30-200 pounds per square inch (207-1,380 kPa), the dynamic operating pressures of the reservoir volume 30 and annulus 16 can be in the range of 500 to 2,000 pounds per square inch (3,450 to 13,800 kPa).

In operation the leading high pressure wave passes the vent opening 24, the zone of high pressure attempts to drive the damping fluid through the vent 24 into the reservoir 30. Reservoir 30, being completely filled with the relatively incompressible damping fluid, experiences a nearly instantaneous increase in fluid pressure as a result. The increased fluid pressure in the reservoir volume 30 has a limited effect on the volumetric rate of fluid flow through the exit orifice 34 as discussed above, preventing the reservoir from quickly relieving the high pressure pulse through increased exit fluid flow. The cooperative effort of the solid fluid reservoir 30, fixed orifice 34 and vent 24 thus opposes significant increased flow of damping fluid from the annulus 16 through the vent 24 during the passage of the high pressure zone past the vent opening 24.

Upon passage of the circumferential pressure have past the vent 24, the pressure in the reservoir is reduced by fluid communication with the trailing low pressure zone in the annulus 16. Although the movement of fluid from the reservoir 30 into the annulus 16 via the vent 24 during this period is very small, the effect is still sufficient to maintain sufficient absolute static pressure of the damping fluid in this area, reducing the likelihood of the occurrence of separation between the dissolved gases and the fluid.

In a typical gas turbine engine operating environment, the damping fluid exiting the reservoir 30 through the orifice 34 runs into a collecting sump (not shown) whence it is recycled to the supply conduit 22 by a circulating pump (not shown) or the like. Such systems are nearly universal in the gas turbine engine industry wherein it is additionally desirable to avoid a high circulation rate of the damping fluid (lubricating oil). Such systems may be further augmented by the inclusion of coolers (not shown) or other fluid conditioners.

Figure 2:
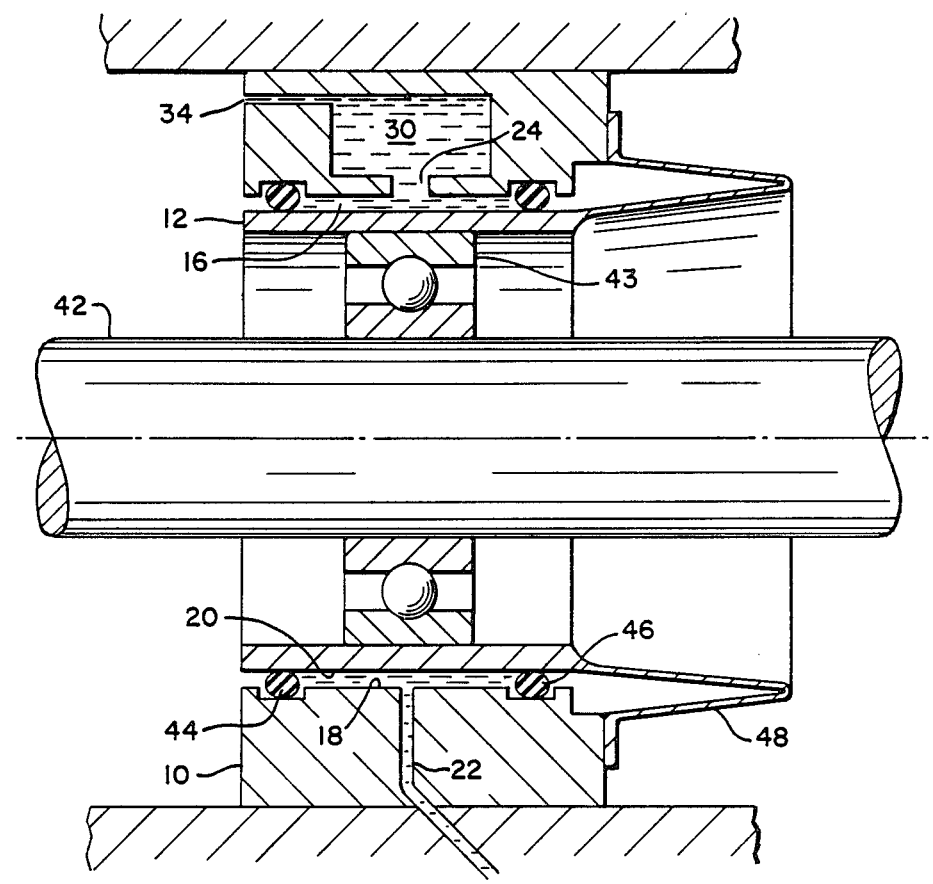
FIG. 2 shows a longitudinal cross sectional view of a prior art damper.

FIG. 2 shows a sectional view of the prior art damper taken in the plane of the central shaft axis. The annular volume 16 is shown between the cylinder surface 20 and the inner surface 18 of the support member 10. Longitudinal flow of damping fluid from the volume 16 is prevented by longitudinal seals such as elastomeric O-rings 44, 46. Also shown is an annular spring flange 48 secured between the sleeve 12 and the support member 10 for holding the sleeve 12 against longitudinal displacement while allowing relatively free radial movement.

The annular volume 16 is thus defined by a fluid-tight, inflexible structure. The only fluid flow paths to or from the volume 16 are as defined by the vent opening 24 and the supply conduit 22.

As can best be seen by referring to FIG. 3, when the lines of centers 14 and 14(a) are aligned at the point of time during the operation of the damper when the pressure is at its peaked value, the lines of pressure or pressure pattern can be drawn as illustrated by reference letter A.

The region not under this portion (A) of the damper is at a reduced pressure which is susceptible to cavitation and/or starvation. According to this invention multiple supply feeds 82 are judiciously located about the circumference, in this instance three are located 120° apart. Hence, as the pressure pattern precesses about the circumference, a supply port will always be present.

Each of the supply ports will incorporate a suitable commercially available check valve 80 or a high frequency check valve of the type disclosed in U.S. Pat. No. 4,655,248 entitled "Check Valve" granted to D. K. Chalaire on Apr. 7, 1987 and assigned to the assignee common to this patent application and which is incorporated herein by reference. The type of check valve used will depend on the particular frequency of the opening and closing of the check valve.

Although this invention has been shown and described with respect to detailed embodiments thereof, it will be understood by those skilled in the art that various changes in form and detail thereof may be made without departing from the spirit and scope of the claimed invention.

We claim:

1. A fluid supply system for preventing cavitation and/or starvation of the fluid film in a squeeze film damper, comprising a nonrotating sleeve-like element, mounted about a shaft being supported by bearings, an annular support surrounding said sleeve-like element, a fluid-tight annular volume between said support and sleeve-like element, a vent for porting fluid from said annular volume, the squeeze film damper controlling the transverse orbital movement of the vibration excited from the shaft whereby a high pressure and low pressure wave pattern precesses orbitally within said fluid-tight annular chamber and inlet ports spaced around the circumference of said annular damper to introduce fluid into said annular volume, and fluid connection means interconnecting a source of high pressure fluid to said inlet ports whereby at least one each of said inlet ports are in communication with the low pressure as the pressure pattern precesses around the annular volume.

2. A fluid supply system as in claim 1 including at least three inlet ports equally spaced about the circumference of said annular volume.

3. A fluid-supply system as in claim 1 including a check valve for each of said inlet ports for preventing the back flow of fluid from said annular volume.

* * * * *